May 2, 1950 — O. L. BOCK — 2,506,336
HEATER
Filed Jan. 24, 1946
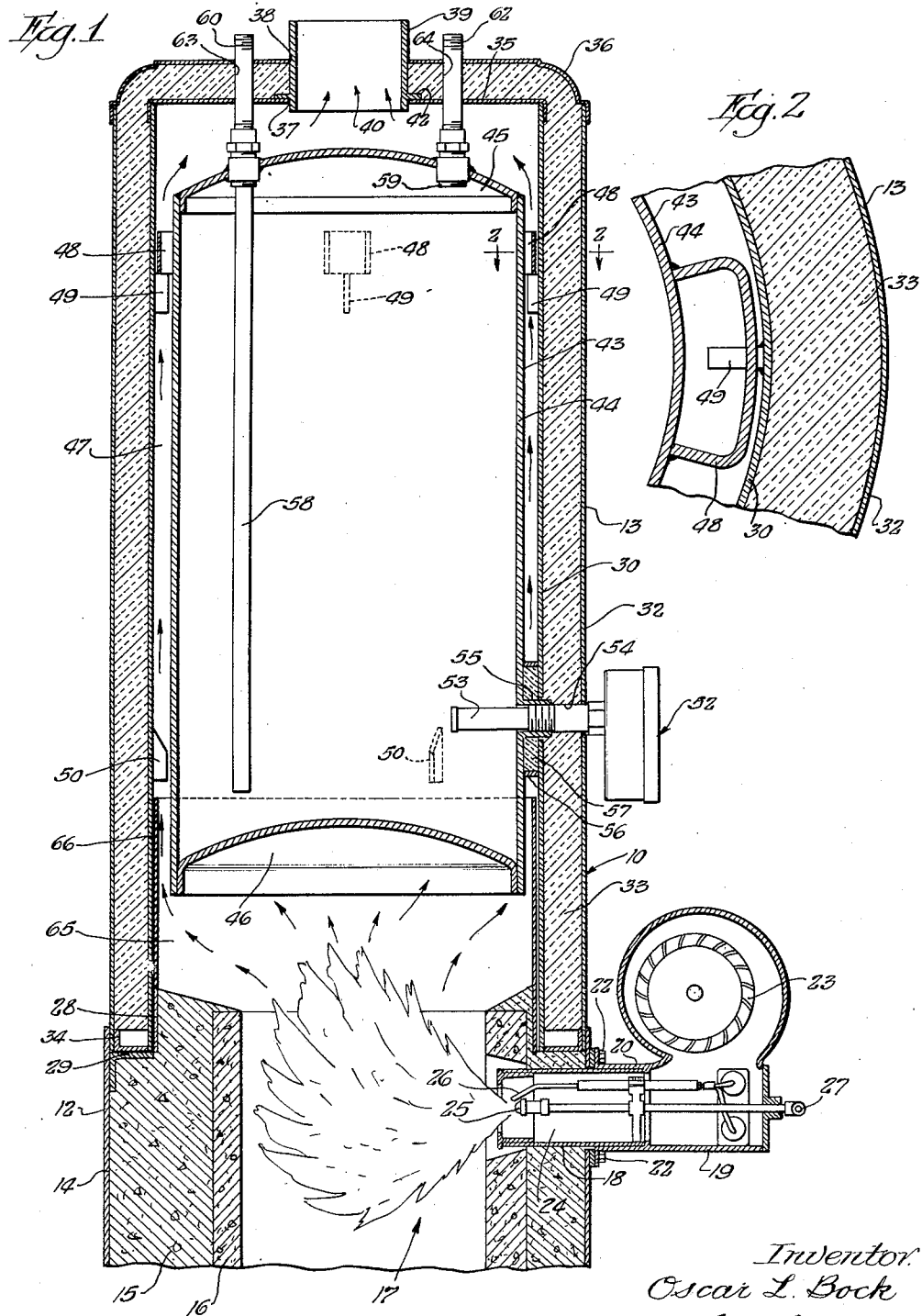
Inventor
Oscar L. Bock
By Albert J. McCaleb
Atty.

Patented May 2, 1950

2,506,336

UNITED STATES PATENT OFFICE 2,506,336

HEATER

Oscar L. Bock, Madison, Wis., assignor to Bock Corporation, Madison, Wis., a corporation of Wisconsin Application January 24, 1946, Serial No. 643,070

2 Claims. (Cl. 122—14)

My present invention relates to heaters, and more particularly to an improved and efficient design for heaters of the type having a relatively concentrated heat source and adapted effectively to heat a mass, such as a tank of water, within a heat insulating enclosure.

As one of its general objects, this invention comprehends the substantial improvement of the heating capacity of a heater of a given size.

Another object of this invention is to provide a design for water heaters such that the water heating capacity of a heater of a given size is considerably increased without materially increasing the cost of the heater.

For a further object, my invention contemplates the provision of a heater incorporating an improved heat transfer system including improved and effective means for conserving and utilizing the hot gases of combustion within an insulated heater housing.

It is also an object of my present invention to provide effective means for extending the high temperature resistant insulation of a heater to a predetermined height above the fire pot portion without the use of bulky refractory material.

Other objects and advantages of the invention will be apparent from the following description and the accompanying one sheet of drawings in which similar characters of reference indicate similar parts throughout the several views.

Referring to the drawings:

Fig. 1 is a vertical transverse sectional view of a water heater embodying a preferred form of my present invention; and Fig. 2 is an enlarged fragmentary sectional view taken substantially on a line 2—2 of Fig. 1 and viewed in the direction indicated by the arrows.

The exemplary embodiment of my invention which is depicted in the accompanying drawings illustrates its adaptation to an oil burning hot water heater of the type utilized in residences and apartment buildings to maintain a supply of hot water. It may be readily understood as the description progresses that the principles and structure of my invention which are incorporated in the hot water heater shown, for purposes of illustration, may be adapted to other types of heaters and to those having different kinds of combustion chambers and other classes of heat sources, such as gas burners, pot top oil burners and the like.

In the heater disclosed, an outer housing 10 includes a base portion 12 and an upper insulated portion 13. Although other sectional shapes might be utilized, that disclosed and generally preferred for manufacturing purposes is circular, so that the housing is generally cylindrical with a vertical central axis. The base portion 12 of the housing comprises a cylindrical outer metal casing 14 which, in the present instance, is internally lined with a wall of insulating material 15 having an internal lining 16 of refractory material defining a combustion chamber 17.

At one side of the base portion 12, an opening 18, which desirably flares outwardly at its inner end, extends through the insulating and refractory linings 15 and 16, as well as the outer casing 14, to accommodate a burner unit 19. For the purposes of the present disclosure, the burner unit 19 includes a housing 20 secured to the outer casing 14 by fastening means, such as cap screws 22, and which housing encloses a blower fan 23 and serves as an air duct for the burner. A metallic extension tube 24 is mounted in the inner end of the housing 20 and extends inwardly of the linings 15 and 16 to enclose a jet 25 and an ignition electrode 26. Fuel is supplied to the jet 25 through a fuel pipe 27 which extends through a wall of the housing 20. The operation, as well as the structure of liquid fuel burners of the type disclosed, is well understood in the art.

The lining 15 of the base portion 12 is peripherally recessed at its upper end to provide a shoulder 28 over which the upper portion 13 of the housing fits. The depth of the recess and its accompanying shoulder 28 are desirably such that the lower end of the upper housing portion fits into the outer casing 14 of the base portion and is supported from the base portion by a plurality of peripherally spaced and inwardly projecting brackets 29 secured to the inner surface of the casing 14.

The upper portion 13 of the housing includes inner and outer metallic shells 30 and 32, respectively, which are cylindrical in form and of different diameters. Desirably, the shells 30 and 32 are concentrically disposed in radially spaced relationship providing a space therebetween which is filled with a suitable heat insulating material 33. At their lower ends the space between the shells is closed by a flanged ring 34.

At the top of the housing, flanged cover plates 35 and 36 fit over the top edges of the inner and outer shells 30 and 32 and are shaped for mounting in substantially parallel relationship with a space therebetween for the accommodation of a packing of insulating material comparable in thickness to that utilized between the shells 30 and 32 forming the side wall of the housing. Centrally of the cover plates 35 and 36, aligned openings 37 and 38 are provided, through which a tubular member 39 extends to provide a flue 40 for the escape of combustion gases from the burner. In my disclosed embodiment, a flange 42 on the outer surface of the tubular member 39 is secured to the inner cover plate 35 to support the tubular member in a position such that it projects outwardly from the top of the housing.

Although in previously known heater structures it has been customary to extend one or more tubular flues upwardly through the interior of the water tank for the transfer of heat from the flue gases to the water contained in the tank, I have very considerably increased the heat transferring areas for a given size of tank in my present heater structure by circulating the heated combustion gases upwardly around the outer surface of the tank in a manner such that practically the entire outer surface area of the tank serves for heat transfer to the water. It may be readily understood that the internal flues not only detract from the capacity of a given size of tank, but their heat transferring surface area is relatively small. This limitation in heat transferring area limits the heating capacity of the tank in terms of units, such as gallons per hour, of water which may be heated in a given tank through a predetermined temperature rise. Furthermore, reduced heat transferring area limits the permissible heat input to the tank from the burner without loss of an excessive amount of heat through the flue.

In the illustrated form of my heater, a tank 43 has a cylindrical side wall 44, onto the ends of which are secured top and bottom end walls 45 and 46, respectively. Preferably, as viewed from the outside, the top end wall 45 is convexly curved and the bottom end wall 46 is concavely curved.

The external dimensions of the tank 43 are smaller both axially and radially than the internal dimensions of the housing 10. I prefer to mount the tank 43 in substantially concentric relationship with the interior of the upper housing portion 13 so that a practically uniform radial space 47 is left between the outer surface of the tank and the interior of the upper housing portion 13 for the upward passage of heated gases from the combustion chamber 17 to the flue 40. The bottom wall 46 of the tank is spaced above the combustion chamber to avoid the actual impingement of the flame upon that surface of the tank and to allow for the spreading of the heat over the bottom surface. The top wall of the tank is spaced from the top of the housing to permit the passage of combustion gases over the top of the tank to the flue.

In order to support the tank 43 within the upper housing portion 13 in the position illustrated and described without materially impeding the upward flow of the heated gases around the tank, I have provided a plurality of substantially U-shaped brackets 48 which are secured to the outer wall of the tank at peripherally spaced portions and rest against coacting and similarly spaced support lugs 49 which are secured to and project inwardly from the inner surface of the inner shell 30. Although the brackets 48 might be placed at various positions axially along the surface of the tank, I have selected a position near the top of the tank since the combustion gases at that position are partially cooled.

To insure and maintain proper alignment of the tank 43 within the upper portion of the housing, I have provided a plurality of peripherally spaced spacer lugs 50 which are secured to and project inwardly from the inner surface of the inner shell 30.

As is usual in automatic water heaters of the type disclosed, an aquastat 52 is provided to control the operation of the burner in accordance with the temperature of the water within the tank. This aquastat has a tubular portion 53 which extends through an opening 54 in the upper housing portion 13 and is threaded into a connecting flange 55 on the side wall 44 of the tank. In order to prevent the heat of the combustion gases from appreciably influencing the operation of the aquastat, a metallic ring 56 is concentrically mounted with respect to the connecting flange 55 and radially spaced therefrom to confine an enclosing layer of heat insulating material 57 between the side wall of the tank and the inner surface of the upper housing portion.

As is usual in hot water heaters, a cold water feed pipe 58 extends into the top of the tank and to a position near the bottom; while a hot water outlet pipe 59 extends through the top of the tank and only a short distance into the interior. Suitable pipe connections, indicated at 60 an 62, extend through openings 63 and 64, respectively, in the top of the housing 10 to connect the tank to a cold water supply system and the desired hot water outlet system.

The quantity of heat provided by the burner, for effective and efficient operation of the disclosed heater, should be sufficient to take advantage of the large exposed heating area of the tank so that heat is transferred to the water in the tank through the large side wall area as well as the bottom of the tank. It is also desirable to effect this result without overheating any portion or portions of the bottom wall of the tank. Since that bottom wall forms an obstruction to the direct upward flow of the heated combustion gases, it diverts and somewhat impedes that flow by effecting a necessary radial or lateral movement of the heated gases around the lower end of the tank. As a result of its proximity to the combustion chamber, as well as the diversion of heat flow which is effected by the bottom of the tank, the diversion of heat outwardly and in a lateral direction makes desirable the protection and increased insulation of the lower part of the upper housing portion 13.

In order to effect this protection of the upper housing portion and to limit heat losses through that lower part of the upper housing portion without materially increasing the cost of the heater and the size of the housing at that position, I have provided an internal heat resistant shell 65 which is preferably made of a metal, such as stainless steel, which will effectively maintain heat reflecting properties. The shell 65 is cylindrical in shape and extends upwardly from the base portion of the housing 10 to a height above the bottom wall 46 of the tank. For heat insulating purposes, a peripheral air space 66 is provided between the inner shell 30 of the upper housing portion and the outer surface of the shell 65. Since the shell may be relatively thin, it surrounds the lower portion of the tank in spaced relationship thereto so as to permit the upward flow of heated gases between it and the tank. In the position illustrated and described, the shell 65 is in a position opposed to the outward flow of the heat and tends to confine that heat until it reaches a position for direct upward flow around the outer surface of the tank and during which the heat is absorbed by the water through the side wall of the tank.

From the foregoing description of one illustrative form of water heater, which includes a preferred embodiment of my invention, it may be readily understood that I have provided a water heater having a large surface area for the transfer of heat to the water from the combustion gases. Since the heat transferring area is large, the quantity of heat supplied by the burner may be sufficient to heat a large quantity of water per unit of time through a given temperature rise. Such effective operation has been accomplished without materially increasing the size of the heater. It has also been accomplished without materially increasing the cost of the heater. The use of practically the entire outer surface of the tank as a heat transferring area for the passage of heat from the heated gases to the contained water, together with the effective support of the tank without materially impeding the flow of heated gases, contributes to the increased heating capacity of the tank without a corresponding increase in size. The effective insulation and retention of the heat at the lower end of the tank by the use of the heat resistant and heat refracting metal shell 65 surrounded by a thin air space, effectively contributes to the ability to supply heat to the large available heating area of the tank with good efficiency and without materially increasing the space and cost of insulation for the lower portion of the housing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A heater for water or the like comprising, in combination, a heat insulated housing of generally cylindrical shape and having its axis disposed vertically, said housing having a combustion chamber at its lower end and a flue at its upper end, fuel burning means for the combustion of fuel within said combustion chamber, a cylindrical tank of smaller outside diameter than the internal diameter of the housing, said tank having a concave bottom wall and a convexly curved top wall, circumferentially spaced bracket means near the top of the tank and coacting with similarly spaced bracket means on the inner surface of the housing to support the tank centrally of and in spaced relationship to the housing with the bottom wall spaced above the combustion chamber so that heat from the combustion chamber passes upwardly to the bottom wall and around the outside of the tank to the flue, imparting heat to the contents of the tank in passing, and additional heat reflecting and insulating means extending upwardly from the combustion chamber to a position above the bottom of the tank, the last mentioned means comprehending a cylindrical stainless steel shell disposed in substantially concentric relationship to the housing and tank and spaced from both.

2. A heater for water or the like comprising, in combination, a heat insulated housing of generally cylindrical shape and having its axis disposed vertically, said housing having a combustion chamber at its lower end and a flue at its upper end, fuel burning means for the combustion of fuel within said combustion chamber, a cylindrical tank of smaller outside diameter than the internal diameter of the housing, said tank having a bottom wall and a top wall, means near the top of the tank and coacting with means on the inner surface of the housing to support the tank centrally of and in spaced relationship to the housing with the bottom wall spaced above the combustion chamber so that heat from the combustion chamber passes upwardly to the bottom wall and around the outside of the tank to the flue, imparting heat to the contents of the tank in passing, and additional heat retaining means extending upwardly from the combustion chamber to a position above the bottom of the tank, the last mentioned means comprehending a cylindrical metal shell disposed in substantially concentric relationship to the housing and tank and spaced from both.

OSCAR L. BOCK.

REFERENCES CITED

The following references are of record in the file of this patent:

UNITED STATES PATENTS

| Number | Name | Date |
|---|---|---|
| 811,066 | Janowitz | Jan. 30, 1906 |
| 1,140,239 | Barth | May 18, 1915 |
| 1,352,802 | Faust | Sept. 14, 1920 |
| 1,525,503 | Hauser | Feb. 10, 1925 |
| 1,602,061 | Wilcox | Oct. 5, 1926 |
| 1,637,395 | Shuell | Aug. 2, 1927 |
| 1,691,334 | Braden | Nov. 13, 1928 |
| 1,713,729 | Williams | May 21, 1929 |
| 1,752,536 | Mitchell | Apr. 1, 1930 |
| 1,771,742 | Brombacher | July 29, 1930 |
| 1,779,165 | Hallett | Oct. 21, 1930 |
| 1,802,578 | Schnepp | Apr. 28, 1931 |
| 1,806,114 | Page | May 19, 1931 |
| 1,961,723 | Wilson | June 5, 1934 |
| 1,998,329 | Mechelke | Apr. 16, 1935 |
| 2,059,586 | Kilgour | Nov. 3, 1936 |
| 2,130,086 | Hart | Sept. 13, 1938 |
| 2,210,830 | Bernhard | Aug. 6, 1940 |
| 2,355,923 | O'Day | Aug. 15, 1944 |